Nov. 24, 1953 — H. W. HESTER — 2,660,022
SIDE DELIVERY HAYRAKE
Filed April 23, 1952 — 3 Sheets-Sheet 1

INVENTOR.
Harry W. Hester
BY Robert H. Wendt
Atty.

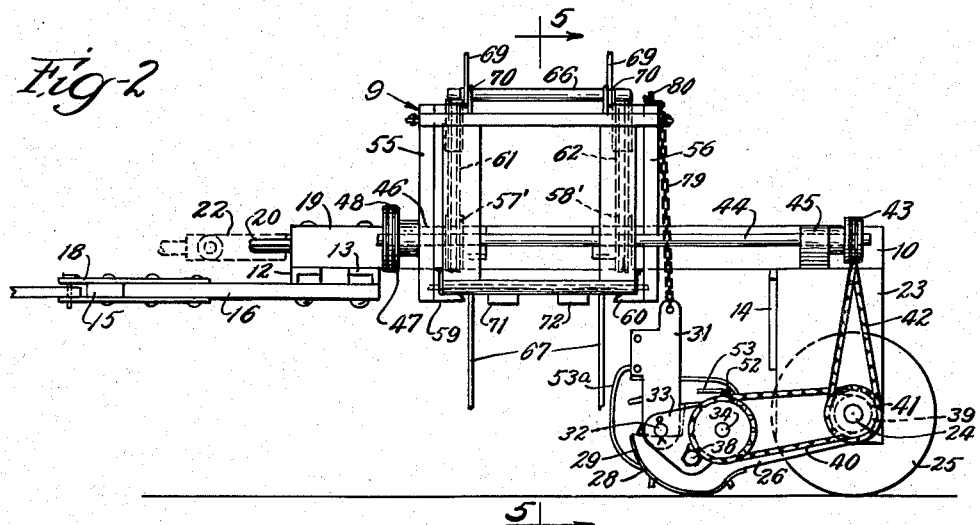
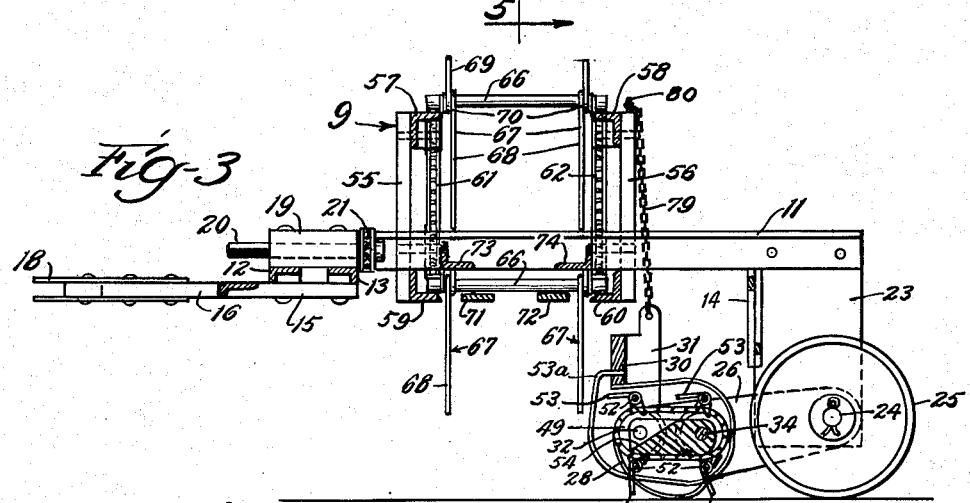
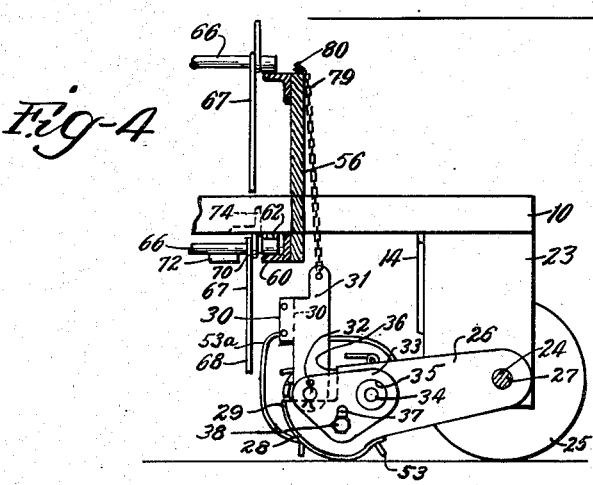

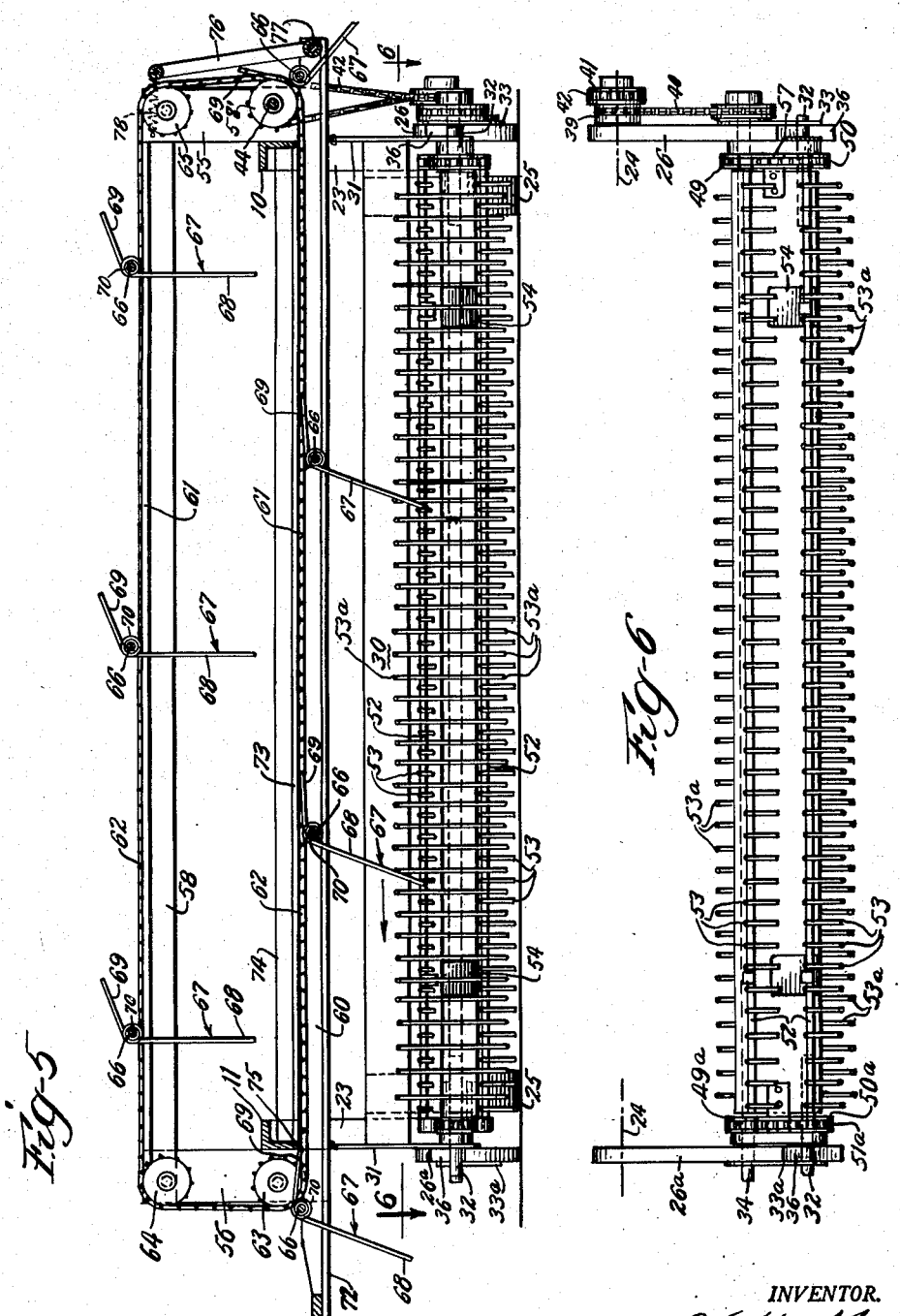

Patented Nov. 24, 1953

2,660,022

UNITED STATES PATENT OFFICE 2,660,022

SIDE DELIVERY HAYRAKE

Harry W. Hester, Chenoa, Ill.

Application April 23, 1952, Serial No. 283,925

11 Claims. (Cl. 56—366)

The present invention relates to side delivery hay rakes, and is particularly concerned with the provision of an improved hay rake of the side delivery type which rakes up the hay cleanly, separates and aerates it, and delivers it at one side in a loose windrow with a minimum amount of bunching and rolling of the hay and a minimum loss of hay leaves by breaking off or other destruction.

One of the objects of the invention is the provision of an improved delivery hay rake which is simple in construction, capable of economical manufacture, durable, efficient, and adapted to gather all the hay and deliver it in a windrow.

Another object of the invention is the provision of an improved side delivery hay rake which is provided with a hay gathering mechanism close to the ground, which follows the terrain and gathers all of the cut hay in front of it and in front of a back board, and which is provided with a laterally driven conveying mechanism which tends to engage and lift and aerate the hay in front of the back board and discharge it in a windrow as fast as it is gathered by the first mechanism.

Another object of the invention is the provision of an improved hay gathering and conveying mechanism which is adapted to pick up the hay and move it by sliding upward into closer engagement with the hay-engaging prongs, while they are in the hay gathering position, but in which the prongs are pivotally released at the point where they are to discharge the hay, so that the hay slides loosely off the prongs and is delivered in front of the back board or in a windrow without clogging or carrying hay over the top of the hay gathering mechanism.

Another object of the invention is to provide a simple and efficient hay gathering and aerating mechanism which may be used to rake the hay in the first instance, or which may be driven over a windrow after the hay has been wet, to separate it again and deliver it in a new loose windrow for drying by the sun.

Other objects and advantages of the invention will be apparent from the following description and the accompanying drawings, in which similar characters of reference indicate similar parts throughout the several views.

Referring to the three sheets of drawings accompanying this specification,

Fig. 2 is a side elevational view taken from the lower end of Fig. 1;

Fig. 3 is a sectional view taken from the plane of the line 3—3 of Fig. 1, looking in the direction of the arrows;

Fig. 4 is a fragmentary sectional view taken on the plane of the line 4—4 of Fig. 1, looking in the direction of the arrows;

Fig. 5 is a sectional view taken on the plane of the line 5—5 of Fig. 3, looking in the direction of the arrows;

Fig. 6 is a fragmentary sectional view taken on the plane of the line 6—6 of Fig. 5, looking in the direction of the arrows.

Figure 1:
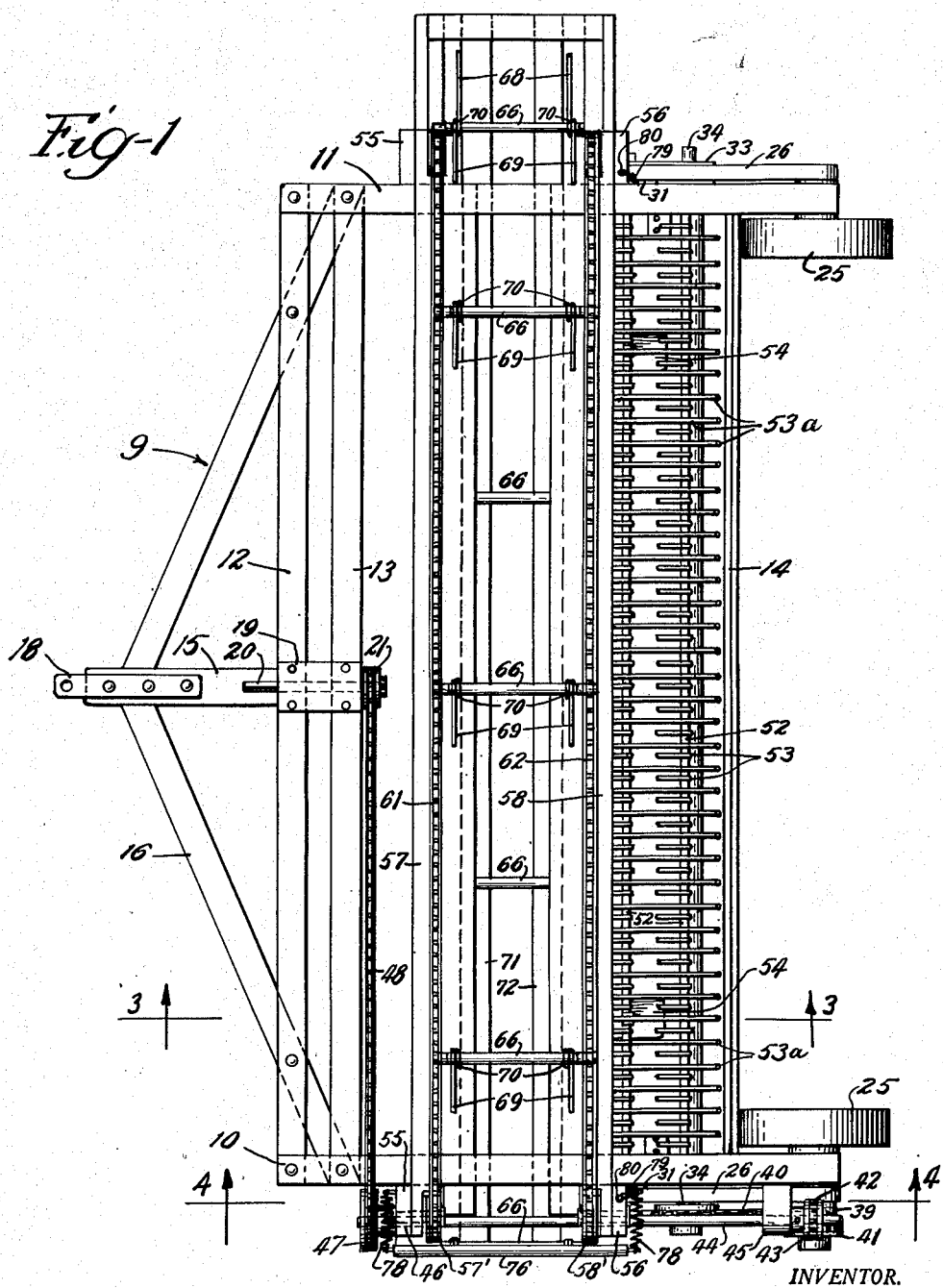
Fig. 1 is a top plan view of a side delivery hay rake embodying my invention.

Referring to Figs. 1 and 2, the side delivery hay rake is indicated in its entirety by the numeral 9; and it preferably includes a horizontal frame having a pair of forwardly and backwardly extending angles 10 and 11, which are joined in the front by a pair of transversely extending angles 12 and 13 riveted or welded to the angles 10 and 11 to form a rectangular frame.

This rectangular frame is held together at the back by crossed braces 14 extending between and secured to the side frame members 10 and 11; and it is provided at the front with a tongue 15 braced by means of two diagonally extending frame members 16 and 17, which are secured to the frame members 12, 10, and 11, and to the tongue.

The tongue carries any convenient type of hitch 18 for securement to the tractor hitch; and the frame members 12 and 13 have secured to them a bearing supporting member 19. The bearing supporting member 19 carries a bearing for a shaft 20, having a sprocket or pulley 21; and the shaft 20 is adapted to be secured by a universal connection 22 to the power take-off of the tractor.

Thus the hay rake is supported at the front by the tractor hitch. At its rear the lateral frame members 10 and 11 carry a pair of depending columns 23, each of which carries a shaft 24, supporting a wheel 25 by means of which the hay rake unit is supported on the ground.

Each of the stub shafts 24 carries a pivoted ground-engaging member 26 by means of a bearing aperture 27. The ground-engaging members 26 may be made of two inch stock, and comprise relatively wide frame members with upwardly curved ground-engaging forward edges 28. These edges may be faced with a curved steel runner 29 for sliding on the ground.

The device is preferably provided with a back board 30, which extends from the side of the hay rake and is carried by a vertically extending side member 31 at each end, these vertically extending frame members having lower apertures receiving a stub shaft 32, whereby they are pivotally secured to a triangular plate 33.

The triangular plate 33 is pivotally mounted on the ground-engaging member 26 by means of the stub shaft 34 and has an enlarged aperture 35 surrounding shaft 34. The ground-engaging member 26 has an angular cut-out at 36 in its upper front edge, forming a shoulder for engaging the stub shaft 32.

The triangular plate 33 has a vertical slot 37, which carries a screw bolt 38, passing through the ground-engaging member 26, whereby the vertical adjustment of the plate 33 may be changed and secured, to determine the elevation of the hay gathering mechanism relative to the curved runner 28, which engages the ground.

On its outside the left wheel 25 is provided with a pulley or sprocket 39, having a chain or belt 40, by means of which the gathering mechanism for the hay is driven. Wheel shaft 24 carries a sprocket or pulley, as indicated at 41, rigidly secured thereto and engaging a twisted belt or chain 42, by means of which the two sprockets 39 and 41 are driven.

The belt or chain 42 is driven by pulley or sprockets 43, which is carried by a forwardly extending shaft 44 mounted in bearings 45, 46. At its forward end the shaft 44 carries a pulley or sprocket 47, which is engaged by the chain or belt 48, passing about the pulley or sprocket 21, which is driven by the drive shaft 20.

The stub shaft 32 extends inwardly of the ground-engaging member 26; and on its inner end it carries a sprocket 50 or 50a, which supports the hay gathering mechanism. The shaft 34 extends from one side of the rake to the other and supports second sprockets 49, 49a for the hay gathering mechanism; and a chain 51 passes over both of these sprockets and forms a part of a conveyor for the hay gathering mechanism.

The shaft 34 preferably extends from one side to the other side of the hay rake and has its other end carried by the right hand ground-engaging member 26a (Fig. 6), which is provided with similar sprockets 49a and 50a for supporting that end of the hay gathering mechanism. The chain about these two sprockets is indicated at 51a.

The ground-engaging member 26a is exactly similar in construction to the one disclosed in Fig. 4, and has similar connections to the back board frame member 31 and to a triangular plate 33a. The two chains 51 and 51a of the hay gathering mechanism are provided with a plurality of longitudinally extending pivoted rods 52; and these rods have a multiplicity of downwardly extending prongs 53.

The prongs 53 project outwardly from the tractor and rod assembly 51, 52 and extend downwardly toward the soil to pick up the cut hay and carry it forwardly, delivering the hay at the front end of the assembly, shown in Fig. 6, where it bunches up in front of the back board 30.

The prongs and rods 52, 53 are preferably spring urged into the projecting position relative to by guide 54; but as they pass upward at the forward edges of the chain 51, guide 54 is bevelled on its upper side and tends to turn the prongs in such direction that they deliver the hay off the end of the prongs in each case in front of the back board 30.

Cleaner rods 53a extend downwardly from backboard 30 between prongs 53, below pickup mechanism and up to the backboard.

All the prongs turn together with the rod, and after passing the guides 54, immediately are turned back to the outwardly projecting position. Thus as the rake progresses forwardly the drive from the tractor drives the sprockets 49, 50 and the chains around them, which support the prong bearing rods 52, picking up and gathering and driving the hay ahead of them on the ground and bunching it up in front of the back board 30.

The horizontal framework, including the frame members 10 and 11, supports at each end a pair of vertically extending frame members 55 and 56 (Fig. 3); and these vertical frame members carry angles 57, 58 at the top and angles 59 and 60 at the bottom. These angles 59, 60 extend from side to side of the hay rake and have their recesses or angular portions facing inwardly to provide guides for the chains 61, 62 for a side delivery conveying mechanism.

The forwardly extending shaft 44 (Fig. 2) passes through the vertical frame members 55 and 56 and carries a pair of sprockets 57', 58' (Fig. 2), which are driven by the shaft 44. At the other end of the rake there are a similar pair of sprockets 63 at the bottom and a pair of sprockets 64 at the top of the frame members 55 and 56.

The frame member 55 at the driving end, that is, the right (Fig. 5), carries another pair of sprockets 65 at the top, thus making four sprockets at each end of the angles 57—60 for supporting the side delivery mechanism.

The chains 61, 62 in each case pass over four sprockets and are driven from the shaft 44. At regularly spaced points the chains 61, 62 carry rods 66 (Fig. 5) which extend from chain to chain and carry a plurality of hay conveying prongs 67. These hay conveying prongs have two rod or wire portions 68, 69 (Fig. 5) extending at an angle to each other from a coil portion 70 that is rotatably mounted on rod 66.

As the lateral conveying mechanism is moving in the direction of the arrow at the prong 67 in Fig. 5, it will be seen that the prongs extend forwardly and downwardly in the direction of their movement. While the legs 68 of the prongs 67 are long and extend down to near the shafts 32 and 34 in front of the back board 30, prongs 67 are spaced from the ground and pick up the hay only when it rises in front of the back board and before the delivery mechanism to the height of the prongs 67.

Thereafter prongs 67 tend to cause the hay to slide upward on the legs 68, which lifts and separates the hay and causes it to be aerated. As seen in Fig. 3, prongs 67 are disposed adjacent each chain 61, 62 on the rods 66 and are separated from each other by a pair of transversely extending boards 71, 72, which extend from side to side of the hay rake and act to keep the hay from sliding up any farther on the prongs 67.

Boards 71, 72 tend to clean the hay from the prongs at the delivery end of the hay rake, which is the left end of Fig. 5.

The shorter legs 69 of each prong 67 slidably engage the transversely extending prong guides 73, 74 as long as the prongs are passing along the under side of these guides, as shown in Fig. 5. When the prong passes the end of the guide 74 at the point 75 (Fig. 5), leg 69 is free to pivot counterclockwise in Fig. 5, permitting the prong 67 to pivot backward at its lower leg 68 to release the hay in a windrow below the left end of the machine in Fig. 5.

Thereafter the weight of the longer leg 68 of each prong 67 tends to cause it to hang downward from the upper portion of each chain, as shown in Fig. 5.

At the right end of the machine (Fig. 5) a spring pressed guide plate 76 is pivotally mounted at the frame at 77 and is wide enough to engage prongs 67 on both chains. The guide plate 76 engages the shorter leg 69 of each prong 67 and causes it to pivot counterclockwise in Fig. 5 to make its longer end clear the shaft 44 so that thereafter the prong 67 may then pass downward to the position shown at the right end of Fig. 5.

The springs for the spring pressed plate 76 are indicated at 78 (Fig. 1) and extend from the upper corners of this plate to the frame.

The operation of my side delivery hay rake is as follows. When being conveyed from place to place, a chain 79 for each supporting plate 31 is hooked on a pin 80 on the frame, lifting the ground-engaging members 26 off the ground temporarily. When ready to rake, this chain 79 is permitted to have slack so that the ground-engaging members 26 have their runners 28 sliding on the ground, following the terrain as they pivot on the shaft 24.

As the rake is drawn forward, the prongs 53 on the pickup mechanism pick up the hay from the ground and drive it forwardly and bunch it up in front of the back board 30. As fast as the hay is gathered and bunched up in front of the back board 30, the side delivery prongs 67 take hold of it; and these prongs are driven laterally fast enough to lift and aerate the hay and deliver it in a windrow at the left side of Fig. 5.

Thus the hay is cleanly picked up; and the pick-up mechanism may be driven sufficiently fast so that all the hay is cleanly picked up; and the side delivery mechanism may be driven at a suitable speed so that the hay is constantly cleaned away from in front of the back board.

The hay will be delivered in a loose, well aerated windrow, where it can be dried further by the sun; and hay which has been lost in the past, due to faulty hay raking mechanism, may be suitably handled and treated and preserved.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a side delivery rake of the type having a pick-up mechanism for bunching the hay below a side delivery mechanism, the improvement which comprises a wheel-supported, box-shape frame, said frame being laterally elongated and having vertical, front, rear, and lateral frame members, a drive shaft rotatably mounted on one of said lateral frame members and extending in a forward and rearward direction, a pair of sprockets on said shaft spaced from each other, additional sprockets rotatably mounted on said frame forming a set of four sprockets arranged in alignment at the front and at the rear of said frame, an endless driven chain about each set of four sprockets, parallel rods carried by said chains and extending from chain to chain at regularly spaced intervals, a plurality of wire prong members rotatably mounted upon each rod, each prong member having a coiled portion about said rod and having a longer raking leg extending outwardly from said rod, a shorter leg slidably engaging said front and rear frame members as guides, the longer legs projecting downward and laterally in the direction of motion on those portions of the chains which are below the sprockets, and the shorter leg trailing horizontally on said guides, the prongs engaging and lifting bunched hay due to the angle of said longer legs and carrying the hay to the side of the frame to deliver it in a windrow.

2. In a side delivery rake of the type having a pick-up mechanism for bunching the hay below a side delivery mechanism, the improvement which comprises a wheel-supported, box-shape frame, said frame being laterally elongated and having vertical, front, rear, and lateral frame members, a drive shaft rotatably mounted on one of said lateral frame members and extending in a forward and rearward direction, a pair of sprockets on said shaft spaced from each other, additional sprockets rotatably mounted on said frame forming a set of four sprockets arranged in alignment at the front and at the rear of said frame, an endless driven chain about each set of four sprockets, parallel rods carried by said chains and extending from chain to chain at regularly spaced intervals, a plurality of wire prong members rotatably mounted upon each rod, each prong member having a coiled portion about said rod and having a longer raking leg extending outwardly from said rod, a shorter leg slidably engaging said front and rear frame members as guides, the longer legs projecting downward and laterally in the direction of motion on those portions of the chains which are below the sprockets, and the shorter leg trailing horizontally on said guides, the prongs engaging and lifting bunched hay due to the angle of said longer legs and carrying the hay to the side of the frame to deliver it in a windrow, said shorter leg passing off said guides at the delivery end of said rake, the drag of the hay and weight of the prongs causing the prongs to pivot backwardly to an angular trailing position of the longer leg to release the hay more readily in the windrow.

3. In a side delivery rake of the type having a pick-up mechanism for bunching the hay below a side delivery mechanism, the improvement which comprises a wheel-supported, box-shape frame, said frame being laterally elongated and having vertical, front, rear, and lateral frame members, a drive shaft rotatably mounted on one of said lateral frame members and extending in a forward and rearward direction, a pair of sprockets on said shaft spaced from each other, additional sprockets rotatably mounted on said frame forming a set of four sprockets arranged in alignment at the front and at the rear of said frame, an endless driven chain about each set of four sprockets, parallel rods carried by said chains and extending from chain to chain at regularly spaced intervals, a plurality of wire prong members rotatably mounted upon each rod, each prong member having a coiled portion about said rod and having a longer raking leg extending outwardly from said rod, a shorter leg slidably engaging said front and rear frame members as guides, the longer legs projecting downward and laterally in the direction of motion on those portions of the chains which are below the sprockets, and the shorter leg trailing horizontally on said guides, the prongs engaging and lifting bunched hay due to the angle of said longer legs and carrying the hay to the side of the frame to deliver it in a windrow, said frame also supporting laterally extending hay stripping and guiding members below the lower portions of the chains and rods, and spaced from each other to pass the longer prong legs for slidably engaging the lifted hay.

4. In a side delivery rake of the type having a pick-up mechanism for bunching the hay below a side delivery mechanism, the improvement which comprises a wheel-supported, box-shape frame, said frame being laterally elongated and having vertical, front, rear, and lateral frame members, a drive shaft rotatably mounted on one of said lateral frame members and extending in a forward and rearward direction, a pair of sprockets on said shaft spaced from each other, additional sprockets rotatably mounted on said frame forming a set of four sprockets arranged in alignment at the front and at the rear of said frame, an endless driven chain about each set of four sprockets, parallel rods carried by said chains and extending from chain to chain at regularly spaced intervals, a plurality of wire prong members rotatably mounted upon each rod, each prong member having a coiled portion about said rod and having a longer raking leg extending outwardly from said rod, a shorter leg slidably engaging said front and rear frame members as guides, the longer legs projecting downward and laterally in the direction of motion on those portions of the chains which are below the sprockets, and the shorter leg trailing horizontally on said guides, the prongs engaging and lifting bunched hay due to the angle of said longer legs and carrying the hay to the side of the frame to deliver it in a windrow, said frame also supporting laterally extending hay stripping and guiding members below the lower portions of the chains and rods, and spaced from each other to pass the longer prong legs for slidably engaging the lifted hay, said latter members projecting laterally from the frame at the delivery side of the rake to strip the hay from the trailing prongs as they rise at that end.

5. In a side delivery rake of the type having a pick-up mechanism for bunching the hay below a side delivery mechanism, the improvement which comprises a wheel-supported, box-shape frame, said frame being laterally elongated and having vertical, front, rear, and lateral frame members, a drive shaft rotatably mounted on one of said lateral frame members and extending in a forward and rearward direction, a pair of sprockets on said shaft spaced from each other, additional sprockets rotatably mounted on said frame forming a set of four sprockets arranged in alignment at the front and at the rear of said frame, an endless driven chain about each set of four sprockets, parallel rods carried by said chains and extending from chain to chain at regularly spaced intervals, a plurality of wire prong members rotatably mounted upon each rod, each prong member having a coiled portion about said rod and having a longer raking leg extending outwardly from said rod, a shorter leg slidably engaging said front and rear frame members as guides, the longer legs projecting downward and laterally in the direction of motion on those portions of the chains which are below the sprockets, and the shorter leg trailing horizontally on said guides, the prongs engaging and lifting bunched hay due to the angle of said longer legs and carrying the hay to the side of the frame to deliver it in a windrow, said prongs depending from the upper parts of the chains, and said frame supporting a spring pressed guide plate at the end of said frame, engaging the shorter legs as the prongs pass down at the drive end of the frame, causing the prongs to swing outward at their longer legs to clear said drive shaft.

6. In a side delivery rake of the type having a supporting frame with wheels and a side delivery mechanism for moving bunched hay laterally into a windrow, the improvement which comprises a pick-up and bunching mechanism comprising a pair of ground engaging members pivoted at one end on said frame and having a curved runner at the other end to slide on the ground, a pair of sprockets rotatably mounted on each of said ground engaging members, a chain belt about each pair of sprockets, one sprocket at each end being mounted upon an elongated drive shaft extending from end to end of said rake, a plurality of elongated parallel rods extending from one chain to the other chain, a multiplicity of prongs having coils about each rod and each having a projecting hay gathering leg and a guide leg, and a guide member inside said chains and rods and engaged by said guide legs, to turn the hay gathering legs to project downward as they pass forwardly near the ground.

7. In a side delivery rake of the type having a supporting frame with wheels and a side delivery mechanism for moving bunched hay laterally into a windrow, the improvement which comprises a pick-up and bunching mechanism comprising a pair of ground engaging members pivoted at one end on said frame and having a curved runner at the other end to slide on the ground, a pair of sprockets rotatably mounted on each of said ground engaging members, a chain belt about each pair of sprockets, one sprocket at each end being mounted upon an elongated drive shaft extending from end to end of said rake, a plurality of elongated parallel rods extending from one chain to the other chain, a multiplicity of prongs having coils about each rod and each having a projecting hay gathering leg and a guide leg, and a guide member inside said chains and rods and engaged by said guide legs, to turn the hay gathering legs to project downward as they pass forwardly near the ground, said guide member turning said projecting legs to trailing position as the prongs pass upward and backward to deliver the hay off the prongs.

8. In a side delivery rake of the type having a supporting frame with wheels and a side delivery mechanism for moving bunched hay laterally into a windrow, the improvement which comprises a pick-up and bunching mechanism comprising a pair of ground engaging members pivoted at one end on said frame and having a curved runner at the other end to slide on the ground, a pair of sprockets rotatably mounted on each of said ground engaging members, a chain belt about each pair of sprockets, one sprocket at each end being mounted upon an elongated drive shaft extending from end to end of said rake, a plurality of elongated parallel rods extending from one chain to the other chain, a multiplicity of prongs having coils about each rod and each having a projecting hay gathering leg and a guide leg, and a guide member inside said chains and rods and engaged by said guide legs, to turn the hay gathering legs to project downward as they pass forwardly near the ground, and a multiplicity of curved cleaner rods extending downwardly between prongs in front of the prongs and under the parallel rods, to strip the hay from the prongs and bunch it in advance of the cleaner rods.

9. In a side delivery rake of the type having a supporting frame with wheels and a side delivery mechanism for moving bunched hay laterally into a windrow, the improvement which comprises a pick-up and bunching mechanism comprising a pair of ground engaging members pivoted at one end on said frame and having a curved runner at the other end to slide on the ground, a pair of sprockets rotatably mounted on each of said ground engaging members, a chain belt about each pair of sprockets, one sprocket at each end being mounted upon an elongated drive shaft extending from end to end of said rake, a plurality of elongated parallel rods extending from one chain to the other chain, a multiplicity of prongs having coils about each rod and each having a projecting hay gathering leg and a guide leg, and a guide member inside said chains and rods and engaged by said guide legs, to turn the hay gathering legs to project downwardly near the ground, and a multiplicity of curved cleaner rods extending downwardly between prongs in front of the prongs and under the parallel rods, to strip the hay from the prongs and bunch it in advance of the cleaner rods, said frame carrying a backboard above said cleaner rods for slidably engaging the bunched hay for lateral movement.

10. In a side delivery rake of the type having a supporting frame with wheels and a side delivery mechanism for moving bunched hay laterally into a windrow, the improvement which comprises a pick-up and bunching mechanism comprising a pair of ground engaging members pivoted at one end on said frame and having a curved runner at the other end to slide on the ground, a pair of sprockets rotatably mounted on each of said ground engaging members, a chain belt about each pair of sprockets, one sprocket at each end being mounted upon an elongated drive shaft extending from end to end of said rake, a plurality of elongated parallel rods extending from one chain to the other chain, a multiplicity of prongs having coils about each rod and each having a projecting hay gathering leg and a guide leg, and a guide member inside said chains and rods and engaged by said guide legs, to turn the hay gathering legs to project downward as they pass forwardly near the ground, and a multiplicity of curved cleaner rods extending downwardly between prongs in front of the prongs and under the parallel rods, to strip the hay from the prongs and bunch it in advance of the cleaner rods, said frame carrying a backboard above said cleaner rods for slidably engaging the bunched hay for lateral movement, and flexible means for supporting the free ends of said ground engaging members from the frame.

11. In a hay rake, the combination of a supporting frame with two pairs of sprocket wheels rotatably mounted on said frame, the sprockets being mounted in pairs on the same axis for supporting parallel endless chain belts, a chain belt about two sprockets at one end of the frame and another chain belt about two sprockets at the other end of the frame, parallel rods carried by the chain belts and regularly spaced from each other and extending from one chain belt to the other, a plurality of prongs on said rods, each prong having a coiled portion serving as a bearing for rotatably supporting said prongs, and each prong having a longer leg for engaging hay and a shorter leg for controlling the position of the longer leg, and fixed guide means carried by said frame for engaging said shorter prongs during that portion of the motion of the prongs when the longer legs are projecting downwardly, the shorter legs slidably engaging said guides and holding the longer legs in downward position until the prongs reach the delivery end of their travel, when the shorter legs pass off the guides and permit the longer legs to trail backwardly to free themselves from the hay.

HARRY W. HESTER.

References Cited in the file of this patent

UNITED STATES PATENTS

| Number | Name | Date |
|---|---|---|
| 1,166,136 | Leasure | Dec. 28, 1915 |
| 1,252,156 | Oberholtzer | Jan. 1, 1918 |
| 2,385,829 | Melroe | Oct. 2, 1945 |
| 2,605,599 | Curry | Aug. 5, 1952 |